3,755,511
HALOALKOXY- AND HALOALKYLTHIO- PHENYL PHOSPHATES, PHOSPHOROTHIOATES AND PHOSPHORODITHIOATES
Lennon H. McKendry, Eric R. Larsen, and Fred Y. Edamura, Midland, Mich., assignors to The Dow Chemical Company, Midland, Mich.
No Drawing. Filed Feb. 1, 1971, Ser. No. 111,684
Int. Cl. A01n 9/36; C07f 9/12, 9/18
U.S. Cl. 260—951      17 Claims

ABSTRACT OF THE DISCLOSURE

Novel haloalkoxy- and haloalkylthio- phenyl phosphates, phosphorothioates and phosphorodithioates corresponding to the formula:

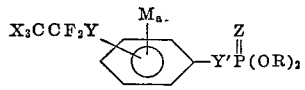

wherein each X independently represents hydrogen, bromo, chloro or fluoro, with the proviso that at least one X is always bromo, chloro or fluoro;
Y, Y' and Z each independently represents oxygen or sulfur;
each M independently represents bromo, chloro, fluoro-, iodo, nitro or loweralkyl containing from 1 to about 4 carbon atoms, both inclusive;
$a$ represents an integer of from 0 to 3, both inclusive, and
each R independently represents loweralkyl containing from 1 to about 4 carbon atoms, both inclusive. The novel compounds of the present invention are suitable for use as insecticides, fungicides and herbicides.

SUMMARY OF THE INVENTION

The present invention is directed to a series of novel haloalkoxy- or haloalkylthio- phenyl phosphates, phosphorothioates and phosphorodithioates corresponding to the formula:

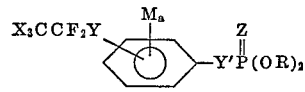

wherein each X independently represents hydrogen, bromo, chloro or fluoro, with the proviso that at least one X is always bromo, chloro or fluoro;
Y, Y' and Z each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
each R independently represents loweralkyl containing from 1 to about 4 carbon atoms, both inclusive.

As used herein, the term "loweralkyl" means saturated, monovalent aliphatic radicals, including straight and branched-chain radicals of from 1 to about 4 carbon atoms, as illustrated by, but not limited to, methyl, ethyl, propyl, isopropyl, butyl, sec.-butyl and the like.

The products of the present invention are oils or crystalline solids at room temperature, of low solubility in water and of varying degrees of solubility in many common organic solvents, such as, for example, carbon tetrachloride, acetonitrile, hexane and the like. The compounds of the present invention are useful as herbicides, fungicides and insecticides.

The novel compounds of the present invention are generally prepared by reacting a phosphorochloridate or phosphorochloroiodothioate compound having the formula:

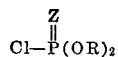

with a substituted haloalkoxy- or haloalkylthio-phenol or thiophenol compound having the formula:

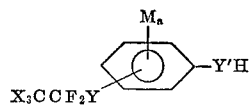

and potassium carbonate. In the above formulas, X, Y, Y', Z, M, $a$ and R are as previously defined.

The reaction is conveniently carried out in an inert solvent which serves as a carrier medium. Representative inert solvents operable in the present invention include acetonitrile, dimethylformamide, chloroform, benzene, acetone, ethyl acetate and the like. The amount of the reactants employed is not critical; ordinarily, essentially equimolar proportions of each reactant is employed. The reaction takes place smoothly at temperatures of from about 0° to about 100° C.; however, the reaction is preferably carried out at temperatures of from about 20 to about 40° C. While the reaction can be conducted over a wide range of pressures, no particular advantage ordinarily results from the use of sub- or super-atmospheric pressures and the reaction is therefore ordinarily carried out under ambient pressure conditions.

In carrying out the reaction, the reactants are contacted in any convenient fashion and the resulting reaction mixture is agitated in the reaction temperature range for a period of time sufficient to assure substantial completion of the reaction. The reaction time period, which varies from about one-half to about 70 hours, is dependent upon the reaction temperature employed as well as the nature of the raw material reactants employed. Generally, the reaction time period ranges from about 30 to about 70 hours when employing phosphorochloridate reactants, and from about one-half to about 10 hours when employing phosphorochloridothioate reactants. Following the completion of the reaction, the reaction mixture is cooled and filtered, and the carrier medium removed in vacuo to obtain the product as a solid or liquid residue; this product residue can be further purified by conventional procedures such as recrystallization, solvent extraction, distillation and the like.

The desirable properties of the products of the present invention are inherent in the pure compounds; when highly selective properties are to be relied upon, the purified compounds will be preferred. However, for many applications, incompletely purified products can be used if desired.

DESCRIPTION OF THE PREFERRED EMBODIMENTS

The following examples illustrate the present invention but are not to be construed as limiting the same.

Example 1

A reaction mixture consisting of 3-(2,2-dichloro-1,1-difluoroethoxy)phenol (5.0 grams; 0.02 mole), potassium carbonate (3.0 grams; 0.02 mole), O,O-diethyl phosphorochloridate (6.0 grams; 0.03 mole) and 45 milliliters of acetonitrile was agitated at a temperature of about 20° C. for a period of about 53 hours. Following the completion of the reaction, the reaction mixture was filtered and the acetonitrile solvent removed in vacuo, leaving a viscous residue. Distillation of the viscous residue thus obtained gave the desired 3-(2,2-dichloro-1,1-difluoroethoxy)phenyl O,O-diethyl phosphate product as an oil having a boiling point of 142° C. at 0.15 millimeter of Hg.

Example 2

A reaction mixture consisting of 4-(2,2-dichloro-1,1-difluoroethoxy)phenol (5.0 grams; 0.02 mole), potassium carbonate (3.0 grams; 0.02 mole), O,O-diethyl phosphorochloridothioate (4.26 grams; 0.02 mole) and 40 milliliters of acetonitrile was heated, with agitation, at the boiling point under reflux for a period of about three and one-half hours. Following the completion of the reaction, the reaction mixture was cooled and filtered and the acetonitrile solvent removed in vacuo. The residual oil thus obtained was distilled to give the desired O-(4-(2,2-dichloro-1,1-difluoroethoxy)phenyl) O,O-diethyl phosphorothioate product as a yellow oil having a boiling point of 136–140° C. at 0.1 millimeter of Hg.

In view of the foregoing teachings and examples, the following haloalkoxy- and haloalkylthio- phenyl phosphates, phosphorothioates and phosphorodithioates are prepared by reacting the appropriate substituted haloalkoxy- or haloalkylthio- phenol or thiophenol compound with the appropriate phosphorochloridates or phosphorochloridothioate compound.

| Ex. No. | Name of product | Identifying characteristic of product [1] |
|---|---|---|
| 3 | 4-(2,2-dichloro-1,1-difluoroethoxy)-phenyl O,O-diethyl phosphate. | B.P. 142–144° C. at 0.15 mm. Hg. |
| 4 | 4-(2,2-dichloro-1,1-difluoroethoxy)-2-nitrophenyl O,O-diethyl phosphate. | B.P. 170–172° C. at 0.2 mm. Hg. |
| 5 | 2-chloro-5-(2,2-dichloro-1,1-difluoroethoxy) phenyl O,O-diethyl phosphate. | B.P. 148–151° C. at 0.2 mm. Hg. |
| 6 | 2,4-dichloro-5-(2,2-dichloro-1,1-difluoroethoxy)phenyl O,O-diethyl phosphate. | B.P. 154–160° C. at 0.2 mm. Hg. |
| 7 | O-(3-(2,2-dichloro-1,1-difluoroethoxy) phenyl) O,O-diethyl phosphorothioate. | B.P. 146–137° C. at 0.15 mm. Hg. |
| 8 | O-(4-(2,2-dichloro-1,1-difluoroethoxy)-2-nitrophenyl) O,O-diethyl phosphorothioate. | B.P. 159–161° C. at 0.1 mm. Hg. |
| 9 | O-(2-chloro-5-(2,2-dichloro-1,1-difluoroethoxy)phenyl) O,O-diethyl phosphorothioate. | B.P. 138° C. at 0.15 mm. Hg. |
| 10 | O-(4-(2,2-dichloro-1,1-difluoroethoxy)-2,6-dinitrophenyl) O,O-diethyl phosphorothioate. | M.P. 101–102° C. |
| 11 | O-(4-(2,2-dichloro-1,1-difluoroethoxy)-2-nitrophenyl) O,O-dimethyl phosphorothioate. | B.P. 154–158° C. at 0.075 mm. Hg. |
| 12 | O-(2-chloro-5-(2,2-dichloro-1,1-difluoroethoxy)phenyl) O,O-dimethyl phosphorothioate. | B.P. 130–132° C. at 0.075 mm. Hg. |
| 13 | O-(3-(2,2-dichloro-1,1-difluoroethoxy)-phenyl) O,O-dimethyl phosphorothioate. | B.P. 128–129° C. at 0.075 mm. Hg. |
| 14 | O-(4-(2,2-dichloro-1,1-difluoroethoxy)-phenyl) O,O-dimethyl phosphorothioate. | B.P. 128° C. at 0.075 mm. Hg. |
| 15 | O-(4-(2,2-dichloro-1,1-difluoroethoxy)-2,6-dinitrophenyl) O,O-dimethyl phosphorothioate. | M.P. 83–85° C. |
| 16 | O-(2,4-dichloro-5-(2,2-dichloro-1,1-difluoroethoxy)phenyl) O,O-dimethyl phosphorothioate. | B.P. 146° C. at 0.1 mm. Hg. |
| 17 | 2-(2-bromo-1,1,2-trifluoroethylthio)-phenyl O,O-di-n-butyl phosphate. | M.W. 478.9. |
| 18 | 4-(2,2,2-trichloro-1,1-difluoroethylthio)-phenyl O,O-diethyl phosphate. | M.W. 285.0. |
| 19 | O-(2-(2-bromo-1,1,2-trifluoroethoxy)-phenyl) O,O-di-n-butyl phosphorothioate. | M.W. 478.9. |
| 20 | S-(4-(2,2-dichloro-1,1-difluoroethylthio) phenyl) O,O-dimethyl phosphorodithioate. | M.W. 399.0. |
| 21 | 2,4,6-trichloro-3-(2,2-dichloro-1,1-difluoroethoxy)phenyl O,O-di-n-propylphosphate. | M.W. 510.5. |
| 22 | S-(2,4,6-trichloro-3-(2-bromo-1,1,2-trifluoroethylthio)phenyl) O,O-dimethylphosphorothioate. | M.W. 514.4. |
| 23 | O-(3,5-dichloro-2-(2,2-dichloro-1,1-difluoroethoxy)phenyl) O,O-dimethyl phosphorothioate. | M.W. 436.0. |
| 24 | S-(3,5-dichloro-2-(2,2,2-trichloro-1,1-difluoroethoxy)phenyl) O,O-diethyl phosphorodithioate. | M.W. 514.5. |
| 25 | 3-(2,2-dichloro-1,1-difluoroethoxy)-2,4,6-trifluorophenyl O,O-di-n-butylphosphate. | M.W. 489.0. |
| 26 | O-(2-(2-bromo-1,1,2-trifluoroethylthio)-3,5-difluorophenyl) O,O-dimethyl phosphorothioate. | M.W. 446.9. |
| 27 | S-(5-(2,2-bromo-1,1-difluoroethoxy)-2-fluorophenyl) O,O-diethyl phosphorodithioate. | M.W. 596.7. |
| 28 | 2,4,6-tribromo-3-(2,2-dichloro-1,1-difluoroethoxy)phenyl O-methyl O-n-butyl phosphate. | M.W. 629.7. |
| 29 | O-(2,4,6-tribromo-3-(2-bromo-1,1,2-trifluoroethylthio)phenyl) O,O-di-n-propyl phosphorothioate. | M.W. 703.6. |
| 30 | S-(3,5-dibromo-2-(2,2,2-trichloro-1,1-difluoroethoxy)phenyl) O,O-dimethyl phosphorodithioate. | M.W. 575.3. |
| 31 | 3-(2,2-dichloro-1,1-difluoroethoxy)-2,4,6-triiodophenyl O,O-di-n-butylphosphate. | M.W. 812.7. |
| 32 | O-(3-(2-bromo-1,1,2-trifluoroethylthio)-2,4,6-triiodophenyl) O,O-dimethyl phosphorothioate. | M.W. 788.6. |
| 33 | S-(2-(2,2,2-bromo-1,1-difluoroethoxy)-3,5-diiodophenyl) O,O-dimethyl phosphorothioate. | M.W. 786.5. |
| 34 | S-(2-(2,2-dichloro-1,1-difluoroethoxy)-3,5-diiodophenyl) O,O-diethyl phosphorodithioate. | M.W. 662.8. |
| 35 | O-(3-(2-chloro-1,1-difluoroethylthio)-2,4,6-trinitrophenyl) O,O-di-isopropylphosphorothioate. | M.W. 539.5. |
| 36 | O-(3-(2,2,2-tribromo-1,1-difluoroethoxy)-2,4,6-trinitrophenyl) O,O-di-n-butylphosphorothioate. | M.W. 753.7. |
| 37 | S-(2-(2-bromo-1,1,2-trifluoroethoxy)-3,5-dinitrophenyl) O,O-diethyl phosphorodithioate. | M.W. 528.9. |
| 38 | 3-(2,2-dichloro-1,1-difluoroethoxy)-2,4,6-tri-isopropylphenyl O,O-di-n-butyl phosphate. | M.W. 561.0. |
| 39 | O-(3-(2-bromo-1,1,2-trifluoroethylthio)-2,4,6-triethylphenyl) O,O-dimethyl phosphorothioate. | M.W. 494.9. |
| 40 | S-(2-(2,2-dichloro-1,1-difluoroethoxy)-3,5-dimethylphenyl) O,O-diethyl phosphorodithioate. | M.W. 439.0. |
| 41 | O-(5-(2,2-dichloro-1,1-difluoroethylthio)-2-methylphenyl) O,O-diethyl phosphorothioate. | M.W. 425.0. |
| 42 | 2,4-dichloro-3-(2,2-dichloro-1,1-difluoroethoxy)-6-fluorophenyl O,O-di-n-butyl phosphate. | M.W. 503.0. |
| 43 | O-(2,4-dibromo-6-chloro-3-(2-bromo-1,1,2-trifluoroethylthio)phenyl) O,O-diethyl phosphorothioate. | M.W. 631.2. |
| 44 | S-(3-(2,2-dichloro-1,1-difluoroethoxy)-2,4-diethyl-6-nitrophenyl) O,O-diethyl phosphorothioate. | M.W. 496.0. |
| 45 | S-(2-chloro-3-(2,2,2-trichloro-1,1-difluoroethoxy)-4,6-dinitrophenyl) O,O-dimethyl phosphorodithioate. | M.W. 542.0. |
| 46 | O-(2-bromo-3-(2,2-dichloro-1,1-difluoroethoxy)-4-methyl-6-nitrophenyl) O,O-dimethyl phosphorothioate. | M.W. 504.9. |
| 47 | 3-bromo-2-(2,2-dichloro-1,1-difluoroethoxy)-5-fluorophenyl O,O-di-n-propyl phosphate. | M.W. 503.9. |
| 48 | S-2-(2-bromo-1,1,2-trifluoroethylthio)-3-tert.-butyl-5-nitrophenyl) O,O-diethyl phosphorothioate. | M.W. 539.9. |
| 49 | O-(3-chloro-2-(2,2,2-tribromo-1,1-difluoroethoxy-5-nitrophenyl) O,O-diethyl phosphorothioate. | M.W. 642.2. |
| 50 | S-(3-chloro-2-(2,2-dichloro-1,1-difluoroethoxy)-5-isopropylphenyl) O,O-dimethyl phosphorodithioate. | M.W. 495.5. |

[1] B.P.=Boiling Point; M.P.=Melting Point; M.W.=Molecular Weight.

The products of the present invention are suitable for use as herbicides, fungicides and insecticides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same plants, insects or fungal organisms. The exact concentration of the toxic substituent to be employed in the treating compositions is not critical and may vary considerably provided the plant, insect or fungal organism and/or their respective habitats are contacted with an effective amount of the toxicant. The concentration of the toxicants in liquid compositions generally is from about 1.0 to about 50 percent by weight. Concentrations up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

In representative operations, numerous compositions containing 500 parts of one of the compounds of the present invention as sole toxicant per million parts by weight of ultimate treating composition were prepared and separately applied to the environments containing and supporting thriving Mycobacterium phlei organisms. In such operations, each of the 3-(2,2-dichloro - 1,1 - difluoroethoxy)phenyl O,O-diethyl phosphate; 4-(2,2 - dichloro - 1,1 - difluoroethoxy - 2 - nitro)phenyl O,O-diethyl phosphate; 2-chloro - 5 - (2,2-dichloro-1,1-difluoroethoxy)phenyl O,O-diethyl phosphate; 2,4-dichloro-5 - (2,2 - dichloro - 1,1 - difluoroethoxy)phenyl O,O-diethyl phosphate; O-(4-(2,2 - dichloro - 1,1 - difluoroethoxy) - 2,6 - dinitrophenyl) O,O-diethyl phosphorothioate; O-(4-(2,2 - dichloro - 1,1 - difluoroethoxy) - 2-nitrophenyl) O.O-dimethyl phosphorothioate; and O-(4-(2,2 - dichloro - 1,1 - difluoroethoxy) - 2,6 - dinitrophenyl) O,O - dimethyl phosphorothioate compounds gives complete control and kill of Mycobacterium phlei organisms.

In further representative operations, each of the 3-(2,2-dichloro - 1,1 - difluoroethoxy)phenyl O,O-diethyl phosphate; O-(4-(2,2 - dichloro - 1,1 - difluoroethoxy) phenyl) O,O-diethyl phosphorothioate; 4-(2,2-dichloro-1,1 - difluoroethoxy - 2 - nitro)phenyl O,O-diethyl phosphate; 2-chloro - 5 - (2,2-dichloro - 1,1 - difluoroethoxy) phenyl O,O-diethyl phosphate; 2,4-dichloro - 5 - (2,2-dichloro - 1,1 - difluoroethoxy)phenyl O,O-diethyl phosphate; O-(3-(2,2 - dichloro - 1,1 - difluoroethoxy)phenyl) O,O-diethyl phosphorothioate; O-(4-(2,2 - dichloro - 1,1-difluoroethoxy) - 2 - nitrophenyl) O,O-diethyl phosphorothioate; O-(2-chloro - 5 - (2,2-dichloro - 1,1 - difluoroethoxy)phenyl) O,O-dimethyl phosphorothioate; O-(3-(2,2 - dichloro - 1,1 - difluoroethoxy)phenyl) O,O-dimethyl phosphorothioate; O-(4-(2,2 - dichloro - 1,1-difluoroethoxy)phenyl) O,O-dimethyl phosphorothioate and O-(2,4 - dichloro - 5 - (2,2 - dichloro - 1,1 - difluoroethoxy)phenyl) O,O - dimethyl phosphorothioate compounds give substantially complete control of yellow fever mosquito larva when such organisms are contacted with compositions containing one of the above-named compounds at a concentration of 1.0 part per million by weight.

In additional operations, each of the 2,4-dichloro-5-(2,2-dichloro - 1,1 - difluoroethoxy)phenyl) O,O-diethyl phosphate; O-(4-(2,2 - dichloro - 1,1 - difluoroethoxy)-2,6 - dinitrophenyl) O,O-dimethyl phosphorothioate; O-(2 - chloro - 5 - (2,2 - dichloro - 1,1 - difluoroethoxy) phenyl) O,O-diethyl phosphorothioate and O-(2-chloro-5-(2,2-dichloro - 1,1 - difluoroethoxy)phenyl) O,O-dimethyl phosphorothioate compounds give complete control of Southern army worms while each of the 3-(2,2-dichloro - 1,1 - difluoroethoxy)phenyl O,O - diethyl phosphate; O-(2 - chloro - 5 - (2,2 - dichloro - 1,1 - difluoroethoxy)phenyl) O,O-dimethyl phosphorothioate; 4-(2,2 - dichloro - 1,1 - difluoroethoxy)phenyl O,O-diethyl phosphate; 4 - (2,2 - dichloro - 1,1 - difluoroethoxy-2-nitro)phenyl O,O-diethyl phosphate and O-(4-(2,2 - dichloro - 1,1 - difluoroethoxy)phenyl) O,O-dimethyl phosphorothioate compounds gives complete control and kill of two spotted spider mites when such insects are contracted with compositions containing one of the respectively named compounds at a concentration of 500 parts per million by weight.

In additional representative operations, each of the 2,4 - dichloro - 5 - (2,2 - dichloro - 1,1 - difluoroethoxy) phenyl O,O - diethyl phosphate; 2-chloro - 5 - (2,2-dichloro - 1,1 - difluoroethoxy)phenyl O,O - diethyl phosphate and O-(2-chloro - 5 - (2,2 - dichloro-1,1-difluoroethoxy)phenyl) O,O-diethyl phosphorothioate compounds gives complete control of Johnson grass and each of the O-(4-(2,2-dichloro - 1,1 - difluoroethoxy) - 2 - nitrophenyl) O,O-diethyl phosphorothioate; O-(2-chloro - 5-(2,2-dichloro - 1,1 - difluoroethoxy)phenyl) O,O-diethyl phosphorothioate and O-(4-(2,2 - dichloro - 1,1 - difluoroethoxy) - 2,6 - dinitrophenyl) O,O-diethyl phosphorothioate compounds gives complete control of pigweeds when such plants are contacted with compositions containing one of the respectively named compounds at a dosage rate of 20 pounds per acre.

The O,O-diloweralkyl phosphorochloridates and O,O-diloweralkyl phosphorochloridothioates, employed as starting materials as described herein, are prepared in known procedures by reacting phosphorus oxychloride or phosphorus thiochloride with an alkali metal alcoholate to introduce two alkoxy groups into the molecule. Where it is desired to produce the mixed diester, the phosphorus oxychloride or phosphorus thiochloride is reacted successively with different alcoholates. Good results are obtained when employing stoichiometric amounts of the reagents and operating at temperatures at which chloride of reaction is formed. Following the reaction, the desired products art separated by known procedures.

The substituted haloalkoxy- or haloalkylthio- phenol or thiophenol compounds employed as starting materials in the preceding reaction are prepared by halogenating or nitrating a corresponding unsubstituted haloalkoxy- or haloalkylthio- phenol or thiophenol compound or a loweralkyl-substituted haloalkoxy- or haloalkylthio- phenol or thiophenol compound.

The addition of the halogenating or nitrating agent is conveniently carried out in the presence of an inert solvent, such as, for example, acetone, carbon tetrachloride, methylene chloride and the like, at temperatures of from about 0 to about 60° C. over a period of from about 10 minutes to about three hours. Ordinarily, a small amount of an actuating agent, e.g., ferric chloride, aluminum chloride, iodine and the like, is incorporated into the reaction mixture in order to decrease reaction time. Following the addition of the halogenating or nitrating agent, the reaction mixture is agitated at ambient temperatures for a period of from about 1 to about 18 hours, filtered, and washed with water, dilute hydrochloric acid, and the like and dried. Evaporation of the reaction mixture under reduced pressure leaves the desired product as a solid or viscous residue which can be further purified by employing conventional techniques.

The unsubstituted haloalkoxy- or haloalkylthio- phenol or thiophenol compounds employed in the halogenating and nitrating reactions above can be prepared by known or analogous procedures disclosed in the literature. For example, 3-(2,2 - dichloro-1,1-difluoroethoxy)phenol is prepared by the reaction of resorcinol, 1,1-dichloro-2,2-difluoroethylene and potassium hydroxide in the presence of acetone. The 1,1-dichloro-2,2-difluoroethylene reactant is usually sparged into a mixture of the other reactants at a temperature of from about 0 to about 10° C. over a period of about two hours. Following the completion of the reaction, the solvent is removed by evaporation under reduced pressure and the residue thus obtained is dissolved in 10% aqueous potassium hydroxide and subsequently filtered. The aqueous solution is acidified with dilute hydrochloric acid, extracted with carbon tetrachloride and the extract dried over magnesium sulfate. Removal of the carbon tetrachloride solvent by distillation gives the desired 3-(2,2-dichloro-1,1-difluoroethoxy)phenol product as an oil having a boiling point of 108–109° C. at 0.2 millimeters of Hg.

The loweralkyl-substituted haloalkoxy- or haloalkylthio- phenol or thiophenol starting materials are prepared in analogous procedures by reacting a loweralkyl-substituted catechol, resorcinol or hydroquinone compound with a substituted difluoroethylene compound.

The fluoro-substituted or fluoro- and loweralkyl-substituted haloalkoxy- or haloalkylthio- phenol or thiophenol compounds employed in the halogenating and nitrating reactions above are prepared by introducing the fluorine atom into the ring prior to the preparation of the ether. These compounds are prepared from a fluoro- or a fluoro- and loweralkyl- substituted catechol, resorcinol or hydroquinone compound according to the procedures set forth in Illinois State Geological Circular #199, pg. 15 (1955). Other modes of substitution are readily arrived at by the synthesis of ortho-, meta-, or para- fluoro-(2,2-dihalo-1,1-difluoroethoxy)benzene compounds from the corresponding fluorophenols followed by nitration, reduction, diazatization, hydrolysis and the like.

The loweralkyl-substituted catechol, resorcinol and hydroquinone compounds and the substituted difluoroethylene compounds employed above in the preparation of starting materials and the substituted acetate compounds employed as starting materials in the present invention can be prepared by known or analogous methods disclosed in the literature or readily obtained from commercial sources.

Compounds containing the $CX_3CF_2Y$- moiety, wherein X represents bromo or chloro, are readily prepared by photochemically halogenating known compounds of the type

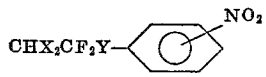

(See Lichtenberger et al., Bull, Soc. Chim. Fr., 4, 581–596 (1957) with an appropriate halogenating agent, such as, for example, $Cl_2$, ClBr and the like, in the presence of a solvent such as carbon tetrachloride or a heterogeneous mixture employing water.

The compounds wherein X is fluoro are prepared by reacting the compounds wherein X is bromo or chloro with a molten antimony fluoro-chloro compound at a temperature of from about 80–120° C. for a period of from about ½ to about 2 hours.

The resulting halo substituted compounds of the above formula are readily reduced to the corresponding anilines with various reducing agents, such as, for example, zinc-hydrochloric acid, hydrogen-Raney nickel, and the like. The anilines are then reacted with sodium nitrite to form diazonium salts which are readily hydrolyzed to the corresponding phenols or thiophenols.

Secondary substituents on the ring may, depending upon the resistance of the substituent to the succeeding reactions, be introduced at various points in the reaction sequence or introduced after the phenol or thiophenol is obtained.

What is claimed is:

1. Compounds corresponding to the formula

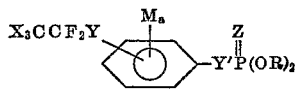

wherein
each X independently represents hydrogen, bromo, chloro or fluoro, with the proviso that at least one X is always bromo, chloro or fluoro;

Y, Y' and Z each independently represents oxygen or sulfur;
each M independently represents bromo, chloro, fluoro, iodo, nitro or loweralkyl containing from 1 to about 4 carbon atoms, both inclusive;
$a$ represents an integer of from 0 to 3, both inclusive, and
each R independently represents loweralkyl containing from 1 to about 4 carbon atoms, both inclusive.

2. A compound of claim 1 which is 3-(2,2-dichloro-1,1-difluoroethoxy)phenyl O,O-diethyl phosphate.

3. A compound of claim 1 which is O-(4-(2,2-dichloro-1,1 - difluoroethoxy)phenyl) O,O-diethyl phosphorothioate.

4. A compound of claim 1 which is 4-(2,2-dichloro-1,1-difluoroethoxy)phenyl O,O-diethyl phosphate.

5. A compound of claim 1 which is 4-(2,2-dichloro-1,1-difluoroethoxy-2-nitro)phenyl O,O-diethyl phosphate.

6. A compound of claim 1 which is 2-chloro-5-(2,2-dichloro-1,1-difluoroethoxy)phenyl O,O-diethyl phosphate.

7. A compound of claim 1 which is 2,4-dichloro-5-(2,2-dichloro - 1,1 - difluoroethoxy)phenyl, O,O-diethyl phosphate.

8. A compound of claim 1 which is O-(3-(2,2-dichloro-1,1-difluoroethoxy)phenyl) O,O - diethyl phosphorothioate.

9. A compound of claim 1 which is O-(4-(2,2-dichloro-1,1-difluoroethoxy) - 2 - nitrophenyl) O,O-diethyl phosphorothioate.

10. A compound of claim 1 which is O-(2-chloro-5-(2,2-dichloro - 1,1 - difluoroethoxy)phenyl) O,O-diethyl phosphorothioate.

11. A compound of claim 1 which is O-(4-(2,2-dichloro-1,1-difluoroethoxy) - 2,6 - dinitrophenyl) O,O-diethyl phosphorothioate.

12. A compound of claim 1 which is O-(4-(2,2-dichloro-1,1-difluoroethoxy)-2-nitrophenyl) O,O - dimethyl phosphorothioate.

13. A compound of claim 1 which is O-(2-chloro-5-(2,2-dichloro-1,1-difluoroethoxy)phenyl) O,O - dimethyl phosphorothioate.

14. A compound of claim 1 which is O-(3-(2,2-dichloro-1,1-difluoroethoxy)phenyl) O,O - dimethyl phosphorothioate.

15. A compound of claim 1 which is O-(4-(2,2-dichloro-1,1-difluoroethoxy)phenyl) O,O - dimethyl phosphorothioate.

16. A compound of claim 1 which is O-(4-(2,2-dichloro-1,1-difluoroethoxy) - 2,6 - dinitrophenyl) O,O-dimethyl phosphorothioate.

17. A compound of claim 1 which is O-(2,4-dichloro-5-(2,2-dichloro-1,1-difluoroethoxy)phenyl) O,O-dimethyl phosphorothioate.

References Cited
UNITED STATES PATENTS 3,162,672    12/1964    Richert et al.    260—949
3,322,864    5/1967    Schrader et al.    260—951 X LEWIS GOTTS, Primary Examiner A. H. SUTTO, Assistant Examiner U.S. Cl. X.R.

260—949; 424—216, 217